(No Model.) 2 Sheets—Sheet 2.
W. D. JONES.
DRILLING TOOL.
No. 467,670. Patented Jan. 26, 1892.
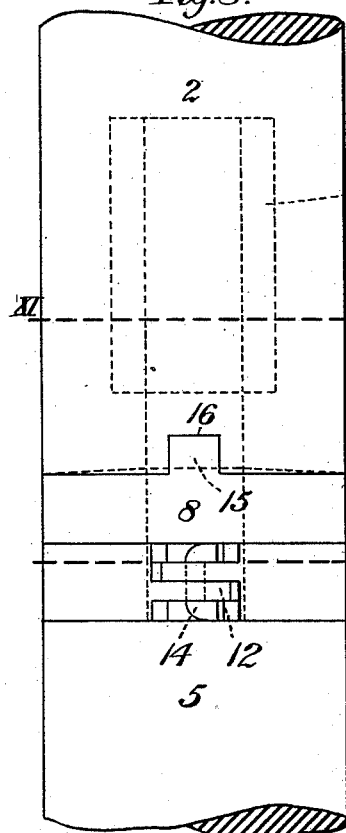
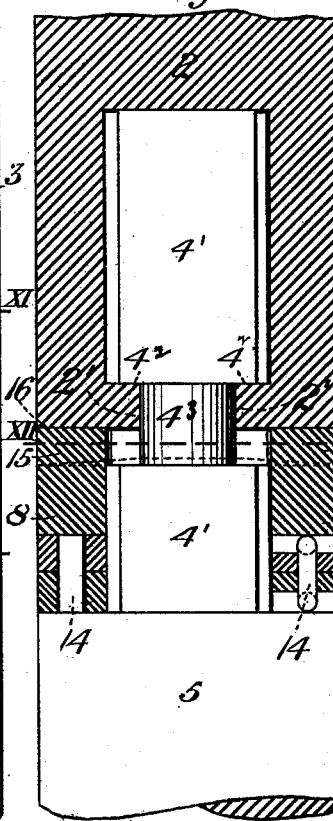
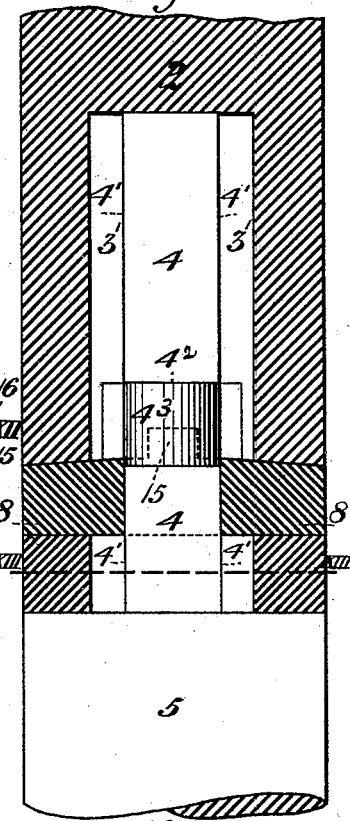
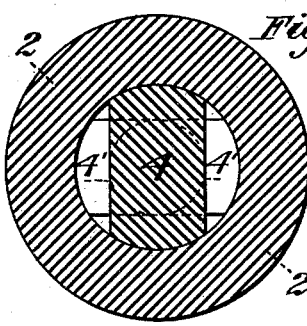
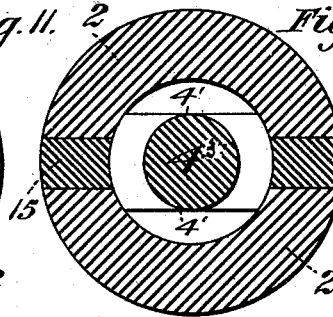
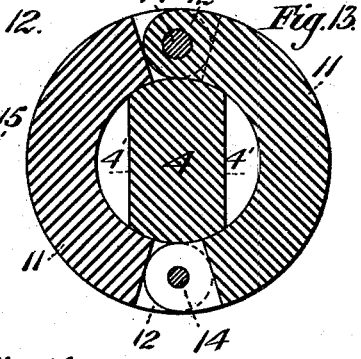
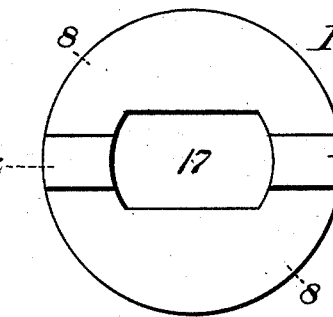
WITNESSES.
W. B. Carson
H. O. Potts
INVENTOR.
William D. Jones.

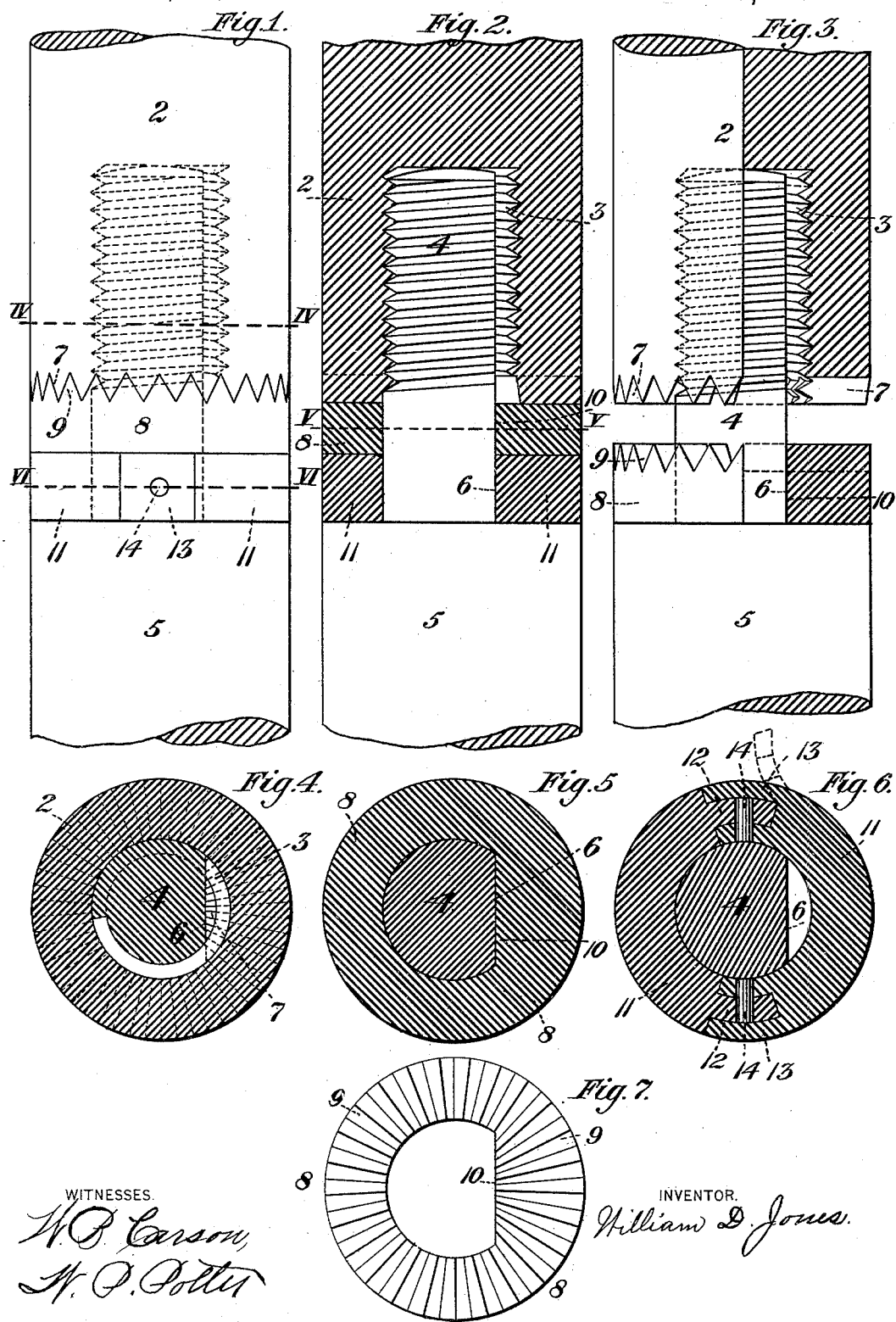

UNITED STATES PATENT OFFICE.

WILLIAM D. JONES, OF PITTSBURG, PENNSYLVANIA.

DRILLING-TOOL.

SPECIFICATION forming part of Letters Patent No. 467,670, dated January 26, 1892.

Application filed April 30, 1891. Serial No. 391,094. (No model.)

*To all whom it may concern:*

Be it known that I, WILLIAM D. JONES, of Pittsburg, county of Allegheny, State of Pennsylvania, have invented or discovered a new and useful Improvement in Drilling-Tools; and I do hereby declare the following to be a full, clear, concise, and exact description thereof, reference being had to the accompanying drawings, making a part of this specification, in which like figures indicate like parts.

Figure 1 is a front elevation, partly broken away, showing my improved lock-joint for drilling-tools. Fig. 2 is a similar sectional view showing part of the bit and the threaded stem in elevation of the drilling-tool. Fig. 3 is a side elevation, partly in section, showing the toothed washer before it is brought up into contact with the bottom of the socket. Fig. 4 is a cross-section on the line IV IV of Fig. 1. Fig. 5 is a cross-section on the line V V of Fig. 2. Fig. 6 is a cross-section on the line VI VI of Fig. 1. Fig. 7 is a plan view of the washer. Fig. 8 is a view similar to Fig. 1, illustrating a modified form of construction. Fig. 9 is a view, partly in section, at right angles to Fig. 8. Fig. 10 is a similar view taken at right angles to Fig. 9. Fig. 11 is a cross-sectional view taken on the line XI XI of Fig. 8. Fig. 12 is a cross-sectional view taken on the line XII XII of Fig. 9. Fig. 13 is a cross-section on the line XIII of Fig. 10, and Fig. 14 is a plan view of the locking-washer.

My invention relates to the improvement of drilling-tools such as are used in drilling oil and artesian wells; and its object is to provide means for preventing the unscrewing of the threaded joints in the tools, and also to provide joints in which the great weight of the tools shall not be borne upon the threads in joints, but upon shoulders on the stem of the bit and on the inside of the socket.

In order that others may understand my improvement, I will proceed to describe it in detail by reference to the drawings, in which—

2 is a socket in the drilling-tool.

3 is the internal thread in the socket, and 4 is the stem of the bit, and the bit itself is shown at 5. The stem is not made entirely circular, but one portion is cut away, leaving a flat surface or face on the stem, which is shown at 6. The lower end of the socket is provided with V-shaped teeth around its entire circumference, which are shown at 7. At 8 is a locking-washer, which is provided with similar V-shaped teeth upon its upper face or circumference, which are shown at 9, fitted to engage on the lower face of the socket with corresponding teeth at 7. At 10 is shown the construction of the inside of the socket with the flat face at that point, which is substantially the same shape for the entire length of the stem of the tool. After the locking-washer having the serrated teeth is pushed into place, a secondary washer, which is shown in section at Figs. 6 and 13, is put on to hold the upper washer in place and prevent its slipping down upon the stem, and thus getting out of engagement with the teeth on the lower face of the socket at 7. This second washer or ring is made in two parts which are interfitting and which are shown at 12 and 13. These interfitting joints or parts are connected or locked together by means of the pins 14.

In the washer shown in Fig. 6 the pins are inserted simply by pulling out laterally the outer flexible tongues, as shown in dotted lines, thereby permitting of the free insertion of the pins horizontally.

The construction shown in Figs. 1, 2, and 3 and in the sectional views of these figures is intended to apply to the old or common form of screw-threaded drill, either straight or beveled. The application of my improvement to this form of drill will take the strain off the thread to a certain extent, and will wholly prevent the unscrewing of the joints, to which there is naturally a great tendency from the constant jarring motion of the drill.

Referring to the modified form of construction shown in Figs. 8, 9, and 10, and the sectional views thereof, as shown in Figs. 11, 12, 13, and 14, I intend it to apply to new drills or drills made without any internal threaded socket, or any threaded portion or stem to the bit. In the use of the screw-thread joint, when the joints are firmly screwed together, if they could be retained in that position there would be no use for the thread except to carry the weight of the tools, and in the improvement which I have here shown the weight of the tools is carried by means of shoulders upon the stem engaging with and resting upon similar shoulders upon the internal portion of the socket. In this form of construction there are two flat surfaces formed upon opposite sides of the stem, and these flat surfaces are clearly shown in the drawings, in which 2' represent shoulders inside and at the lower end of the socket 2, and the space inside of the socket left by the cut-away portion or flattened face of the stem is represented at 3'. These flat faces on the stem which pass through the opening into the socket are shown at 4', and 4² represents shoulders on the stem, which are brought into position for use by turning the stem upon the neck shown at 4³. When the two parts are brought together, the stem is inserted into the corresponding opening of the socket and then given a quarter turn, so that the shoulders upon the stem-piece shall rest against and have bearing upon the corresponding shoulders of the inside of the socket. Before the stem of the bit is inserted in the proper position the locking-washer (which for this form of construction is shown in plan view in Fig. 14) is slipped over the end of the stem of the bit, the opening 17 being made to fit the shape of the stem and the lugs 15 fitting into the openings 16 on the under side of the socket, as shown in Fig. 8, and in this case, in order to insure solidity in the joint and snugness of fit, I also provide a secondary washer, which is in two parts, and which, as before stated, is shown in sectional plan view at Fig. 13. This washer has also interfitting parts, which are connected by pin 14. The interfitting parts should be made thin enough to admit of the pin 14 being easily inserted.

The manner of adjusting the two-part washer is as follows: The pin 14 upon the left of Fig. 9 is inserted before the washer is put in position upon the stem, thus forming a hinge-joint. The washer is then placed around the stem, and the overlapping portions (shown clearly upon the right of Fig. 9) being much thinner than the rest of the washer there is space enough between said overlapping portions and the rest of the tool to admit of the pin 14 being inserted in a vertical position, or nearly so, into its place in the hole, which extends through both the overlapping parts. The washer being flexible, of course the overlapping parts may be forced downward by the pin, if necessary, to provide further room for the insertion of said pin. The hole through the overlapping parts of the washer might, if preferred, be made on a slant, with its edge coming nearly to the outer edge of the overlapping portions. This would to a great extent facilitate the insertion of the pin. It will be understood that in the proper adjustment of the adjacent sections to each other in the use of this joint that before the stem of the lower section is inserted into the socket or screwed home, as the case may be, the locking-washer is to be slipped over the end of the stem. The locking-washer is made so as to fit the shape of the stem, and as the stem has one flattened face (shown at 6) so the washer has a correspondingly flattened face, and therefore when the locking-washer is once adjusted to the stem it cannot rotate upon the stem, and consequently when the stem has been screwed home into the socket, as in the old method of construction, or where it has been adjusted in place by being inserted into the opening provided for it in the form of construction shown in Figs. 8, 9, and 10, and given a quarter-turn, so as to cause the shoulders of the two sections to engage, then in either case the locking-washer is pressed up so as to engage the serrated faces or the lugs and recesses provided for the same purpose, and then the two-part ring or secondary washer is inserted in its place, which keys the whole joint snugly together.

Having thus described my invention, I desire to claim and secure by Letters Patent—

1. The lock-joint for drilling-tools, composed of a socket having serrated end adapted to engage with the corresponding serrated face of a locking-washer, mounted on the stem of the adjacent section of the tool and secured thereon against rotary motion, combined with a secondary washer consisting of a two-part ring, whereby the adjacent serrated faces of the socket and washer are held in engagement, substantially as shown and described.

2. In a lock-joint for drilling-tools, the combination of a stem-section of the drilling-tool having two flattened faces and a circular or neck portion and shoulders secured by insertion within and bearing against corresponding shoulders of an adjacent socket portion of the tool, and a locking-washer mounted upon said stem-section and secured against rotary motion thereon, and a secondary two-part washer or ring preventing longitudinal movement of the locking-washer upon the stem part, substantially as shown and described.

3. In a lock-joint for drilling-tools, the combination of a stem-section of the drilling-tool having two flattened faces, a circular or neck portion and shoulders, a socketed piece to receive said stem-section and provided with shoulders to support the corresponding shoulders of the stem, a locking-washer mounted upon said stem-section and provided at diametrically-opposite points with upwardly-extending lugs fitting corresponding sockets in the upper section, a secondary two-part washer or ring, one of said parts having socketed ends and the other part having its ends provided with tongues fitting the sockets, and pins intersecting the tongues and slots for securing the parts together, substantially as set forth.

In testimony whereof I have hereunto set my hand.

WILLIAM D. JONES.

Witnesses:
WM. A. STONE,
J. A. HOLMAN.